(No Model.)
P. GREGG.
HAY SLED.
No. 435,417. Patented Sept. 2, 1890.
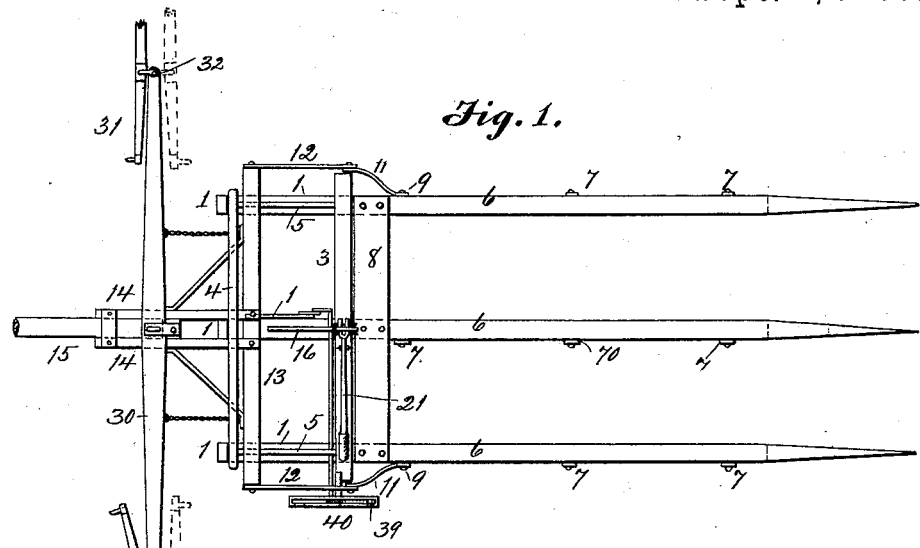
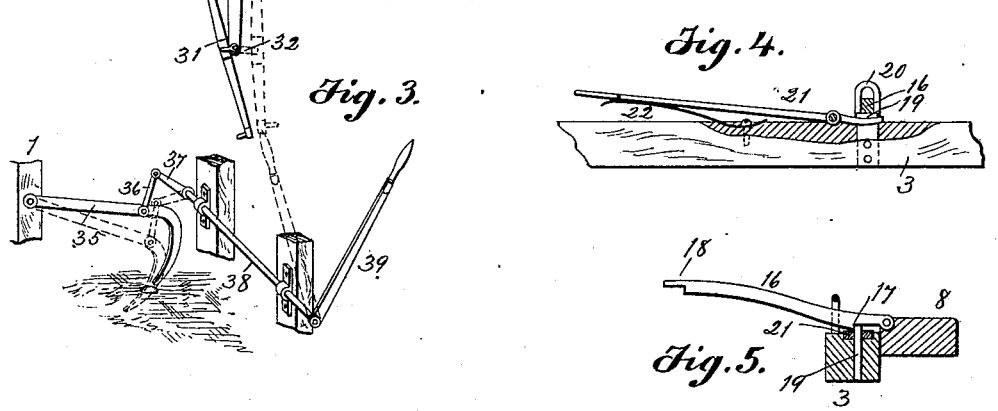
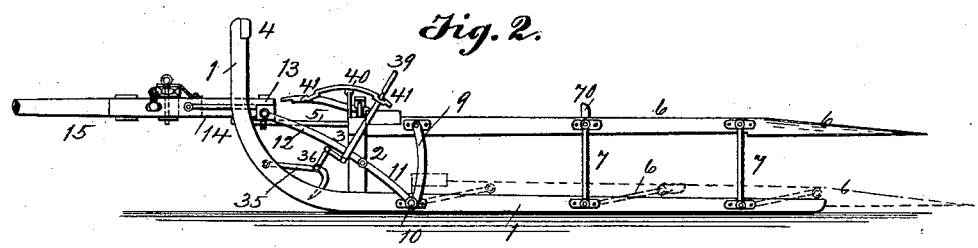
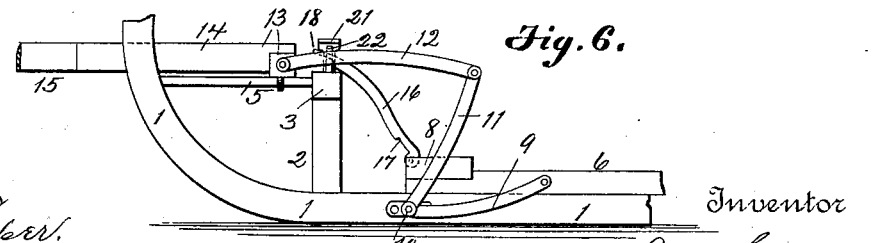
Witnesses
J. G. Lepper
T. W. Johnson
Inventor
Presley Gregg
By his Attorney
W. H. Bartlett

UNITED STATES PATENT OFFICE.

PRESLEY GREGG, OF AURORA, INDIANA.

HAY-SLED.

SPECIFICATION forming part of Letters Patent No. 435,417, dated September 2, 1890.

Application filed June 27, 1890. Serial No. 356,987. (No model.)

*To all whom it may concern:*

Be it known that I, PRESLEY GREGG, residing at Aurora, in the county of Dearborn and State of Indiana, have invented certain new and useful Improvements in Hay-Sleds, of which the following is a specification, reference being had therein to the accompanying drawings.

This invention relates to sleds especially intended for moving hay-cocks, small straw-stacks, and the like.

The object of the invention is to produce a sled which may be backed or drawn under a hay cock or stack without first lifting the stack; also, to lift the fork or other support for the cock after it has passed under the cock by horse-power and maintain it in a position somewhat above the sled-runners; also, to control the lifting and lowering of the fork or platform on which the hay rests and to fasten it in its raised or depressed position; also, to make a self-unloading sled, and also to improve the sled in various particulars.

Figure 1 is a plan of the sled provided with a platform-fork and long whiffletree. Fig. 2 is a side elevation thereof. Fig. 3 is a perspective detail of the anchor or holding-brake. Fig. 4 is a rear elevation of the lever for unlocking the fork-catch; Fig. 5, a detail of double hook. Fig. 6 is a detail side elevation of the front of the sled, showing fork depressed.

The numeral 1 indicates the runners of a sled. These runners may be made of wood and shod or not, as desirable. The runners have knees 2 near the front end and a cross-beam 3 connecting the same. The runners will also preferably be connected at the top of the bows by a cross-beam 4.

By preference the sled will have side and middle runners, each connected to the cross-beams. The beam 3 will be connected to the bow of the runners by bars or rods 5. Bars or tines 6 6 6, about parallel with the runners, are connected to the runners by rigid links 7 7, which links are pivoted both to the runners and to bars 6. The front ends of bars 6 are connected by a cross plate or tie 8. The rear ends of bars 6 are pointed, and when the links 7 are swung to upright position these bars 6 form the upper platform of the sled. When the links are swung down, as in dotted lines, Fig. 2, the bars then lie on top of or close to the runners and constitute a fork, which may be run backward under a hay-cock with very little resistance. The front ends of bars 6 are connected to the runners by links 9. Each link 9 constitutes one arm of a bell-crank lever, pivoted at 10 to the runner and having another rigid arm 11 extending upward from the pivot. The upper ends of lever-arms 11 are connected by links, chains, or draw-rods 12 with the pole-bar 13 of the sleigh. The pole-bar 13 has rigid ties or braces 14 extending forward at each side of the middle runner, and a pole 15 is attached to these ties when desirable. The pole-bar 13 is held to rods 5 by loops passing loosely round said rods, so that the pole and its bar may be drawn forward on the rods. When the pole-bar is drawn forward, as in Figs. 1 and 2, (full lines,) the link 12 draws on the bell-crank lever and tends to turn the arm 9 and links 7 into upright position.

The plate or tie 8 has a hook-plate 16 attached. This hook-plate 16 has two hooks 17 and 18, one facing forward, the other backward. A catch 19 on the beam 3 serves for engagement with either of said hooks. A loop or staple 20 on the beam 3 guides said hook-bar. When the bars 6 constituting the fork are moved back into position shown in Fig. 5 and dotted position in Fig. 2, the hook 18 engages catch 19 and holds the fork back, so that its tines or bars are close to the runners. When the fork is elevated and drawn forward, the hook 17, engaging catch 19, holds the fork in forward position. A lever 21, pivoted on top of beam 3, serves to lift either hook 17 or 18 out of contact with catch 19, when said lever 21 is pressed down against the force of spring 22. The end of lever 21 next the hook-bar is split and straddles catch 19, so that one side of the lever will be in position to lift the hook whether hook 18 or 17 be engaged. Assuming the fork to be dropped down, as in dotted lines, Fig. 2, and held down by hook 18 engaging catch 19, the sled may generally be backed under a hay-cock without much difficulty. For heavy work, however, I arrange a long doubletree 30 on the ties 14, and the singletrees 31 are held to the ends of said doubletree by clevises 32, so as to swing round the ends of said doubletree. The team may then be faced to the rear—one at each side of the sled—and the horses can then pull the sled so that the tines of the fork and sled-runners pass under the hay-cock.

When the hay-cock rests on bars 6 of the fork, it is first desirable to lift the fork and hay above the runners. To do this, the team faces forward whether attached to the long doubletree 30 or to one of common length connected to ties 14. A brake or anchor 35 is thrust down, as will be hereinafter described, to hold the runners against forward movement. The hook 18 is lifted by bearing on lever 21 and the team started. Pole-bar 13 draws links 12, and so turns the bell-crank levers 11 9, and this lifts the fork by turning the lever 9 and links 7 into upright position. As soon as the fork begins to lift the lever 21 is released, and hook 17 will drop into contact with catch 19 as soon as the fork is drawn to its highest forward position. The anchor 35 is released as soon as the fork or platform is elevated and the sled moves off with its load. One or more of the links 7 may have a point 70, which extends above the bar of the fork when turned up, thus holding the load from slipping off. The rear side of this point or tooth 70 should be curved, so as to swing out of the hay when the link lies down. In unloading the catch 17 is released, the bars 6 are allowed to swing down onto the runners, and the sled can be drawn out from under the load. The brake or anchor 35 is a hook pivoted to one of the runners 1 and connected by a pitman 36 with an arm or crank 37 on rock-shaft 38. Shaft 38 is supported in suitable bearings and rocked by lever 39, which is guided by a guard 40, and may be held up or down by swinging said lever 39 into notches 41, as common with brake-levers.

While I have described the sled as having three runners, it will be understood that the middle runner may be omitted. The connection from braces 14 to the ends of levers 11 may be made more direct in the lighter sleds. The brake or anchor 35 may be a hook or spud operated directly by hand instead of by the lever-connections described, and various other parts may be constructed in different equivalent manner without departing from the spirit of my invention. When the tines or bars are of wood, they can be notched or partly cut away to lie close to the runners in the depressed position of said tines, and the rear of the shoes or runners will be rounded up, so that the sled, acting as a fork, will enter under a hay-cock quite easily, the rear ends of the tines slipping along the ground. The pole-brace and connections can of course be altered in many particulars, as is common in sled-making. The whole sled will be strengthened with braces where necessary. When the long doubletree is used, the pole proper is generally detached, and the team, in moving forward, may be held apart by a spreader. The sled may be used with or without the pole.

What I claim is—

1. In combination with the runners of a sled, a series of bars or tines supported thereby and movable links connecting the bars and runners, whereby the bars may lie close to the runners or be supported as a platform above the runners, substantially as described.

2. The combination, with the sled-runners, of a series of bars or tines connected to said runners by movable links, a catch, and a holding-bar engaging said catch to retain the tines in position as an elevated platform, substantially as described.

3. The combination, with the sled-runners, of a series of bars or tines connected thereto by movable links, a catch, and a holding-bar engaging said catch to hold the tines in depressed position close to the bars, substantially as described.

4. The combination of the runners, the series of bars or tines connected thereto by movable links, and a lever connected to the tines or bars and to the pole-support, so that the tines or bars may be lifted by drawing on the pole or its supports, substantially as described.

5. The combination of the runners, the tines or bars connected to said runners by movable links, a bell-crank lever having one arm pivoted to the runners and to the tines or bars, a shifting-pole, and connections from the pole to an arm of the bell-crank lever, whereby the tines or bars may be lifted by drawing on the pole, substantially as described.

6. The combination of the runners having front knees and a cross-beam, the tines or bars having a cross-tie at the front end, movable links connecting the tines or bars and the runners, a catch on the cross-beam, and a hook-bar pivoted to the cross-tie and having a double hook to engage with said catch and lock the tines either up or down, substantially as described.

7. In combination with the runners, tines, and pivoted links connecting the same, a cross-beam having a catch and a lever in proximity thereto and a hook-bar connected to the tines in position to engage the catch and lock the tines either up or down, but to be disengaged by the lever, substantially as described.

8. The combination, with the runners and tines or bars movably connected thereto, of the movable pole-bar connected to the tines to actuate the same and the brake or anchor to lock the runners while the tines are shifting, substantially as described.

9. The combination, with the runners and the movable tines or bars connected thereto, of the pole or pole-support connected to the tines, and a doubletree on the pole or support extending at the sides, so that the animals may be attached and face forward or to the rear alongside the sled, substantially as described.

10. The combination, with the sled having tines projecting rearwardly, substantially as described, of a long doubletree connected to the sled and having singletrees swiveled thereto, so that the team may be attached and faced in either direction, substantially as described.

11. In a sled of the character described, the combination of the runners, the tines connected thereto by links, as described, the cross-knee and draw-bars connecting the same to the bow of the runner, the pole-bar sliding on said draw-bars, connections from the pole-bar to the tines by which the tines may be raised and lowered, and a locking-catch to retain the tines in raised or depressed position, substantially as described.

12. In combination with the runners and tines connected thereto by links, as described, a link having a spike or point extending beyond its pivot on the tine, so that the spike will extend above the tine or platform when lifted, but will turn down alongside the tine when the same is depressed, substantially as described.

In testimony whereof I affix my signature in presence of two witnesses.

PRESLEY GREGG.

Witnesses:
PHILIP MAURO,
W. A. BARTLETT.